United States Patent
Tanaka (10) Patent No.: US 7,100,754 B2
(45) Date of Patent: Sep. 5, 2006

(54) PULLEY UNIT

(75) Inventor: Yasuhito Tanaka, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/997,877

(22) Filed: Nov. 29, 2004

(65) Prior Publication Data

US 2005/0092574 A1   May 5, 2005

Related U.S. Application Data (60) Division of application No. 09/733,907, filed on Dec. 12, 2000, now abandoned, which is a continuation-in-part of application No. 09/102,557, filed on Jun. 23, 1998, now Pat. No. 6,170,625.

(30) Foreign Application Priority Data

Jul. 1, 1997 (JP) ................. P9-175775
Jul. 9, 1997 (JP) ................. P9-183385

(51) Int. Cl.
*F16D 15/00* (2006.01)

(52) U.S. Cl. .................. 192/44; 192/45; 192/110 B (58) Field of Classification Search .................. 192/44, 192/45, 45.1, 45.2, 110 B
See application file for complete search history.

(56) References Cited

U.S. PATENT DOCUMENTS

| | | | |
|---|---|---|---|
| 1,288,327 A | 12/1918 | Westrich | |
| 3,017,002 A | 6/1962 | Marland | |
| 3,194,368 A * | 7/1965 | Benson et al. | ............... 192/45 |
| 3,380,563 A * | 4/1968 | Bowers et al. | ............... 192/44 |
| 3,388,779 A | 6/1968 | Roper | |
| 3,476,226 A | 11/1969 | Massey | |
| 3,481,436 A | 12/1969 | Wilkowski | |
| 3,623,581 A * | 11/1971 | Livezey | ................. 192/45 |
| 3,774,738 A * | 11/1973 | Steinhagen | .............. 192/56.57 |
| 3,851,546 A * | 12/1974 | Kepple et al. | .............. 475/121 |
| 4,083,419 A | 4/1978 | Fogelberg | |
| 4,476,744 A | 10/1984 | Crooks | |
| 5,000,303 A * | 3/1991 | Shoji et al. | ................. 192/45.1 |
| 5,048,651 A | 9/1991 | Lederman | |
| 5,330,393 A * | 7/1994 | Deppert et al. | .............. 475/154 |
| 5,358,456 A * | 10/1994 | Deppert et al. | .............. 475/154 |
| 5,407,045 A * | 4/1995 | Welter et al. | .............. 192/45.1 |
| 5,477,951 A | 12/1995 | Itoh et al. | |
| 5,482,150 A | 1/1996 | Stark | |
| 5,517,957 A * | 5/1996 | Wagner et al. | ............ 123/192.1 |
| 5,518,093 A | 5/1996 | Hartig et al. | |
| 5,547,060 A | 8/1996 | Giese | |

(Continued)

FOREIGN PATENT DOCUMENTS

DE    2017706    * 7/1979

(Continued)

*Primary Examiner*—Ha Ho
(74) *Attorney, Agent, or Firm*—Jacobson Holman PLLC (57) ABSTRACT

A pulley unit made by interposing a one-way clutch in an annular space between a pulley and an axial body providing a deep groove ball bearing on a base end side of the one-way clutch, and a roller bearing on the free end side; setting an inner rolling surface of a roller of the one-way clutch to be an outer diameter surface of the axial body and an inner rolling surface of a rolling member of the roller bearing to be an outer diameter surface of the axial body. The pulley unit permits easy position setting of the pulley, so that stabilized lock and free operation can be expected and productivity can be improved.

4 Claims, 8 Drawing Sheets

U.S. PATENT DOCUMENTS

| | | | |
|---|---|---|---|
| 5,595,272 A * | 1/1997 | Zhou | 192/45 |
| 5,617,937 A * | 4/1997 | Zettner et al. | 192/45 |
| 5,672,110 A * | 9/1997 | Kurita et al. | 192/45 X |
| 5,675,202 A * | 10/1997 | Zenmei et al. | 192/45 X |
| 5,695,031 A * | 12/1997 | Kurita et al. | 192/45 |
| 5,704,458 A | 1/1998 | Neuwirth et al. | |
| 5,908,094 A * | 6/1999 | Le-Calve | 192/41 R |
| 5,996,753 A * | 12/1999 | Temme et al. | 192/45 |
| 6,170,625 B1 | 1/2001 | Tanaka | |

FOREIGN PATENT DOCUMENTS

| | | |
|---|---|---|
| GB | 1 182 378 | 2/1970 |
| GB | 1198504 | 7/1970 |
| GB | 2 078 316 | 1/1982 |
| JP | 6-63942 | 9/1994 |
| JP | 7-317807 | 12/1995 |

* cited by examiner

PULLEY UNIT

This is a divisional of application Ser. No. 09/733,907 filed Dec. 12, 2000, now abandoned, which in turn is a continuation-in-part of application Ser. No. 09/102,557, filed Jun. 23, 1998, now U.S. Pat. No. 6,170,625, issued Jan. 9, 2001.

BACKGROUND OF THE INVENTION

1. Field of the Invention

This invention relates to a pulley unit provided with a one-way clutch. This pulley unit can be installed on an auxiliary machine driven from a crankshaft of an engine of an automobile or the like through a belt. As an auxiliary machine, cited are a compressor for an air conditioner, a water pump, an alternator, a cooling fan and so on of an automobile or the like.

2. Description of the Related Art

Various auxiliary machines installed on an automobile engine are driven through a belt by a crankshaft of the engine. Especially in the case of an alternator among the auxiliary machines, if it is connected in such a manner as to be rotated synchronously with the crankshaft of the engine, when the rotating speed of the crankshaft drops, the power generation capability is lowered.

The applicant of the present invention has considered that the above one-way clutch is built in an alternator, whereby when the rotating speed of a crankshaft drops, the rotation of a rotor of the alternator is continued by its inertia force to heighten the power generation efficiency.

In this case, the one-way clutch is interposed between a pulley of the alternator and the rotor, and according to a rotational difference between the pulley and the rotor, the one-way clutch is switched between the lock state (power transmission state) and the free state (power transmission interruption state) to transmit or cut off power between the pulley and the rotor.

In the described one-way clutch, originally, it is necessary to detent a cage to a member where a cam face is formed for conducting the lock operation and the free operation. As a detent measure for the cage, the applicant of the present invention has considered the construction shown in the specification attached to Japan Utility Model Application No. 5-5162. That is, recessed cam faces formed in several areas of the circumference of an outer ring are extended to one axial end, and projecting parts engaged with the recessed cam faces are provided in the several areas of the circumference of the outer peripheral surface at one axial end of the case, whereby the cage is detented to the outer ring by the circumferential engagement of the projecting parts with the recessed cam faces.

As the conventional one-way clutch is so constructed that the existing recessed cam faces formed on the outer ring are applied to detent the cage, the following disadvantages are caused.

In the first place, the sectional form of the existing recessed cam face does not have a fixed radius of curvature unlike a circular arc. It is considered to be wasteful in respect of cost to work the sectional form of the projecting part corresponding to the recessed cam face with high accuracy only for detent for the cage, so conventionally the projecting part is set to be simply fitted in the recessed cam face. In such a structure, during the lock and free operation of the one-way clutch, the case is liable to be shaken due to the reaction force of an elastic member for energizing a roller, so that the responsiveness at the time of lock and free operation becomes bad and what is worse, there is the possibility that the complete lock state can not be attained. In situations where with the rotating operation of the outer ring body and the inner ring body, vibration is continuously caused, it is pointed out that the cage is sometimes displaced in the axial direction so that the roller is liable to skew and the lock and free operation becomes unstable.

In reflection of the situation as above, there have been proposed the pulley units shown in FIG. 5 through FIG. 8.

Figure 5:
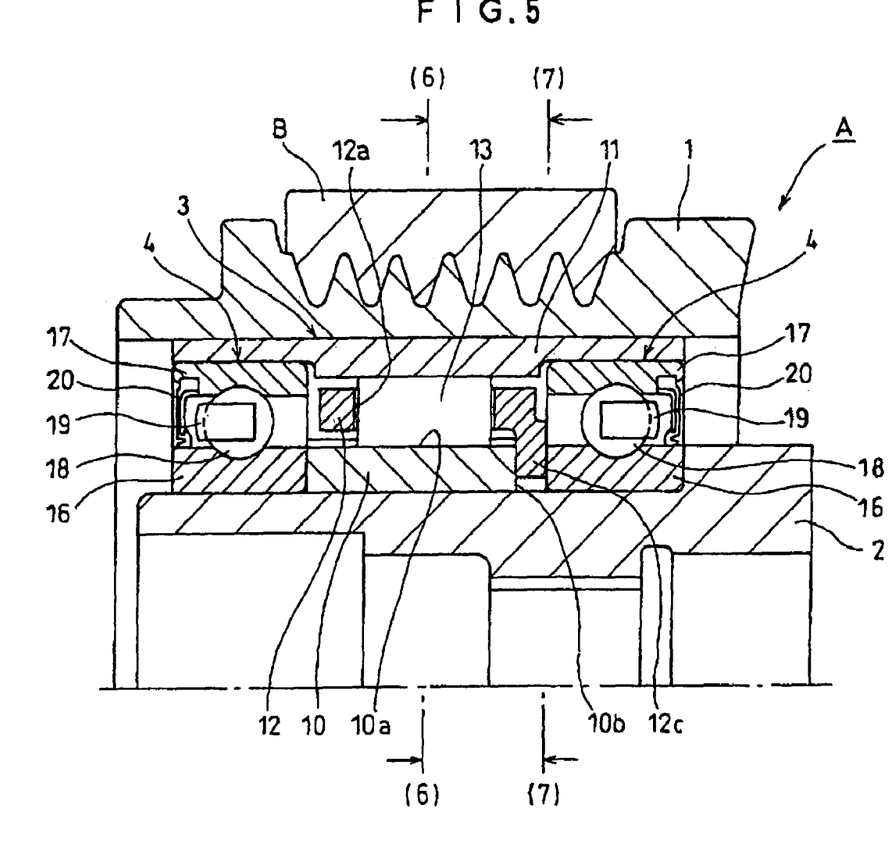
FIG. 5 is a longitudinal section of a pulley unit according to a proposed embodiment.

The illustrated pulley unit A comprises two, inner and outer ring bodies 1, 2 disposed concentrically, a one-way clutch 3 interposed in an annular space between both ring bodies 1, 2, and two rolling bearings 4, 4 disposed on both sides in the axial direction of the one-way clutch 3 in the annular space.

A groove where a wavy belt B is wrapped is formed on the outer periphery of the outer ring body 1. The outer ring body 1 is driven in rotation through a belt B called V-belt by a crankshaft of an automobile engine or the like. The inner ring body 2 is formed by a sleeve-like member, which is fixed to an input shaft (e.g. a rotor of an alternator) of an auxiliary machine of an automobile, not shown.

Figure 6:
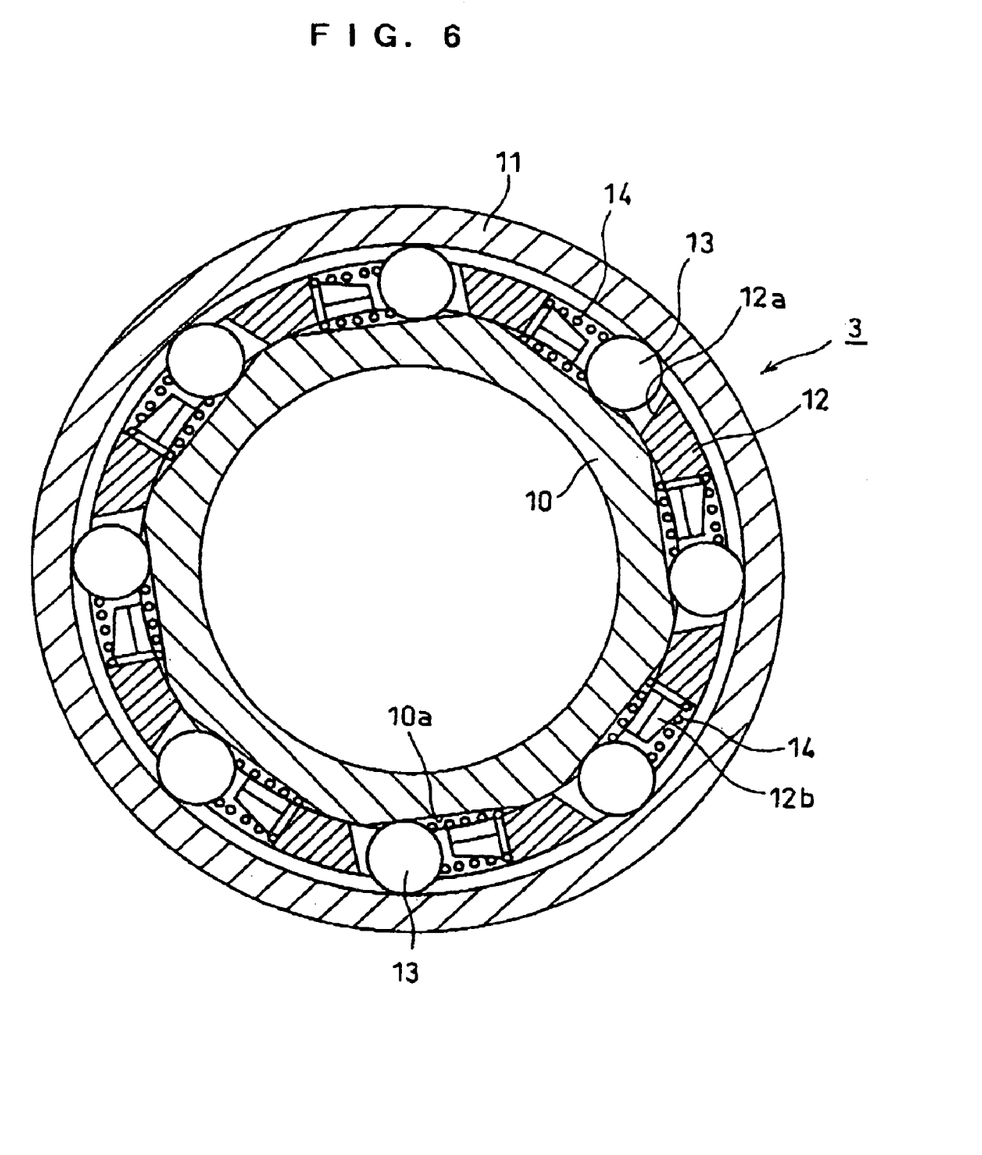
FIG. 6 is a fragmentary view taken in the direction of the arrows along a line (6)—(6) of FIG. 5.
Figure 8:
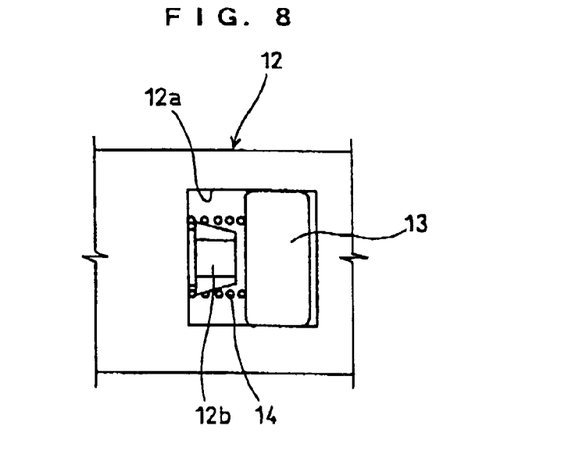
FIG. 8 is a development showing a part of a one-way clutch.

The one-way clutch 3 comprises an inner ring 10 having flat key-like cam faces 10a provided in several areas of the circumference of the outer peripheral surface, an outer ring 11 formed to be elongated in the axial direction in such a manner that the rolling bearings 4, 4 are internally fitted to both ends, a cage 12 having a pocket 12a formed to be pierced inside and outside in the radial direction corresponding to the cam face 10a, a plurality of rollers 13 accommodated one by one in each pocket 12a of the cage 12, and coil springs 14 having a substantially rectangular section as an elastic member which are accommodated one by one in each pocket 12a of the cage 12 and adapted to press the roller 13 to the narrow side (lock side) of a wedge space between the cam face 10a and the inner peripheral surface of the outer ring 11. On the inner wall surface of the pocket 12a of the cage 12, as shown in FIG. 6 and FIG. 8, a projection 12b contracted at the root is integrally formed, one axial end of the coil spring 14 is locked and fitted to the contracted part of the root of the projection 12, and the inner periphery of the coil spring 14 is received by the outer periphery of the projection 12 to prevent distortion when the coil spring 14 is compressed. Further, as shown in FIG. 8, a taper surface for facilitating installation of the coil spring 14 is provided on the outside cylindrical surface of the tip of the projection 12b.

Both of two rolling bearings 4, 4 are formed by a general deep groove ball bearing having an inner ring 16, an outer ring 17, plural balls 18 and a cage 19, and an oil seal 20 as a sealing member is installed only on the axial outer end side between the inner and outer rings 16, 17. That is, the one-way clutch 3 is sealed by two rolling bearings 4, 4, and two rolling bearings 4, 4 and the one-way clutch 3 are lubricated by a common lubricant. Thus, the need of partition construction is eliminated as compared with the case of using the respective lubricants, and also one work operation of injecting a lubricant is sufficient so as to avoid waste.

The operation of the thus constructed pulley unit A will be described. To be short, when the rotating speed of the outer ring body 1 is increased relatively more than that of the inner ring body 2, the roller 13 of the one-way clutch 3 is rolled to the narrow side of the wedge space to be put in the lock state, so that the outer ring body 1 and the inner ring body 2 are integrated and rotated synchronously with each other. However, if the rotating speed of the outer ring body 1 is decreased relatively more than that of the inner ring body 2, the roller 13 of the one-way clutch 3 is rolled to the wide side of the wedge space to be put in the free state, whereby the transmission of rotating power from the outer ring body 1 to the inner ring body 2 is interrupted so that the inner ring body 2 is continuously rotated only by the rotating inertia force.

If the pulley unit A is used in an alternator, regardless of the rotation variation of a crankshaft of an engine as a driving source for a belt B, the rotation of the rotor of the alternator is maintained in a high region to heighten the power generation efficiency. That is, when the rotating speed of the crankshaft is increased, the one-way clutch 3 is put in the lock state to rotate the inner ring body 2 synchronously with the outer ring body 1, and on the contrary, when the rotating speed of the crankshaft is reduced, the one-way clutch 3 is put in the free state so that the inner ring body 2 may be continuously rotated by its rotating inertia force independently of deceleration of the outer ring body 1.

Figure 7:
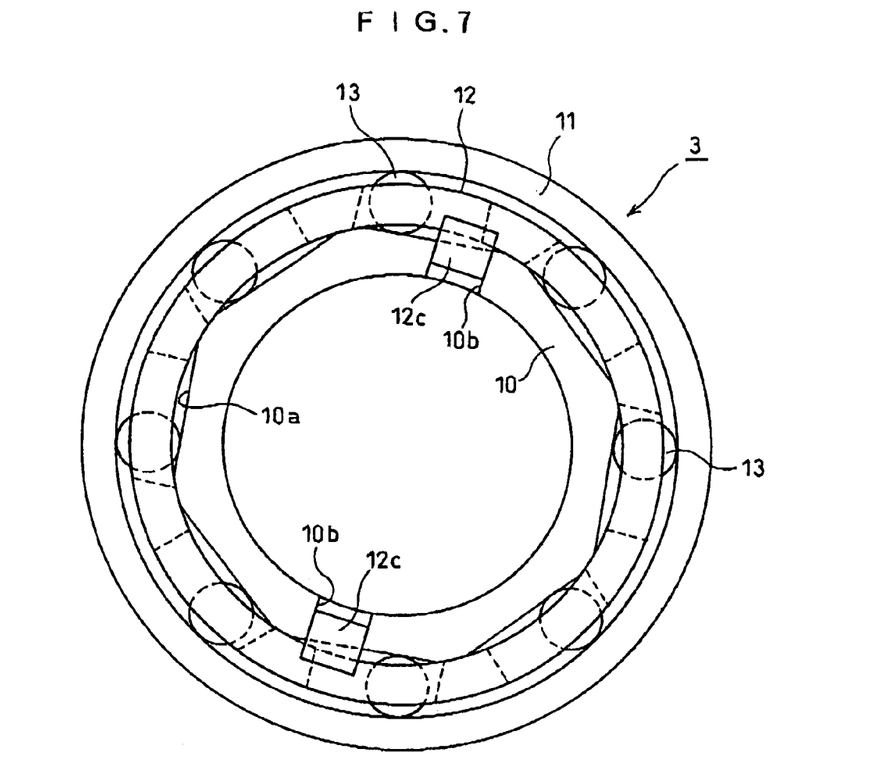
FIG. 7 is a fragmentary view taken in the direction of the arrows along a line (7)—(7) of FIG. 5.

The characteristic construction of the described pulley unit A will now be described. The characteristic construction is mainly that in which the cage 12 of the one-way clutch 3 is immovable in the circumferential direction and in the axial direction. To be concrete, one axial end face of the inner ring 10 of the one-way clutch 3 is provided with a slit-like recessed part 10b which is opened to the shaft end and opened inside and outside in the radial direction, further the inner peripheral side of one axial end of the cage 12 is provided with a projecting part 12c press-fitted in the recessed part 10b from the axial direction, and the circumferential movement of the cage 12 is prohibited by press-fitting of the recessed part 10b and the projecting part 12c. Further, the projecting part 12c is clamped in the axial direction between the inner wall surface of the recessed part 10b and the end face of the inner ring 16 of one rolling bearing 4 disposed on the opening side of the recessed part 10b, thereby prohibiting the axial movement of the cage 12.

The recessed part 10b and the projecting part 12c are provided in two places opposite to each other through 180 degrees in this embodiment. The number may be at least one place or two or more places. If the number is decreased, it is advantageous in that it is not necessary to control the working accuracy not so severely.

If the circumferential and axial movement of the cage 12 of the one-way clutch 3 is thus prohibited, the lock and free operation of the one-way clutch 3 can be conducted stably. That is, If the cage 12 is immovable in the circumferential direction, the reaction force of the resilient energizing force of the roller 13 by the coil spring 14 can be strongly caught, so that the lock operation of the roller 13 can be supported efficiently. On the other hand, if the cage 12 is immovable in the axial direction, even in the situations where vibration and shock are applied from the belt B, the roller 13 is hard to skew. Thus, the lock and free operation of the roller 13 can be stably performed.

Further, since in the proposed embodiment, originally the separation between the recessed part 10b and the projecting part 12c is checked by one rolling bearing 4 provided on the side of the one-way clutch 3, the need of specially using a stop member such as a snap ring or the like can be eliminated to contribute to the reduction in the number of parts and cost.

Further, as the cam face 10a of the one-way clutch 3 is provided on the inner ring 10 in the proposed embodiment, the roller 13 can be prevented from unnecessarily dislocating from the lock position by centrifugal force even in the high speed rotating range. Accordingly, the operational stabilization of the roller 13 can be further heightened by multiplication of the above effect and the effect produced by the movement constraint of the cage 12 so as to contribute to an improvement in reliability.

Figure 9:
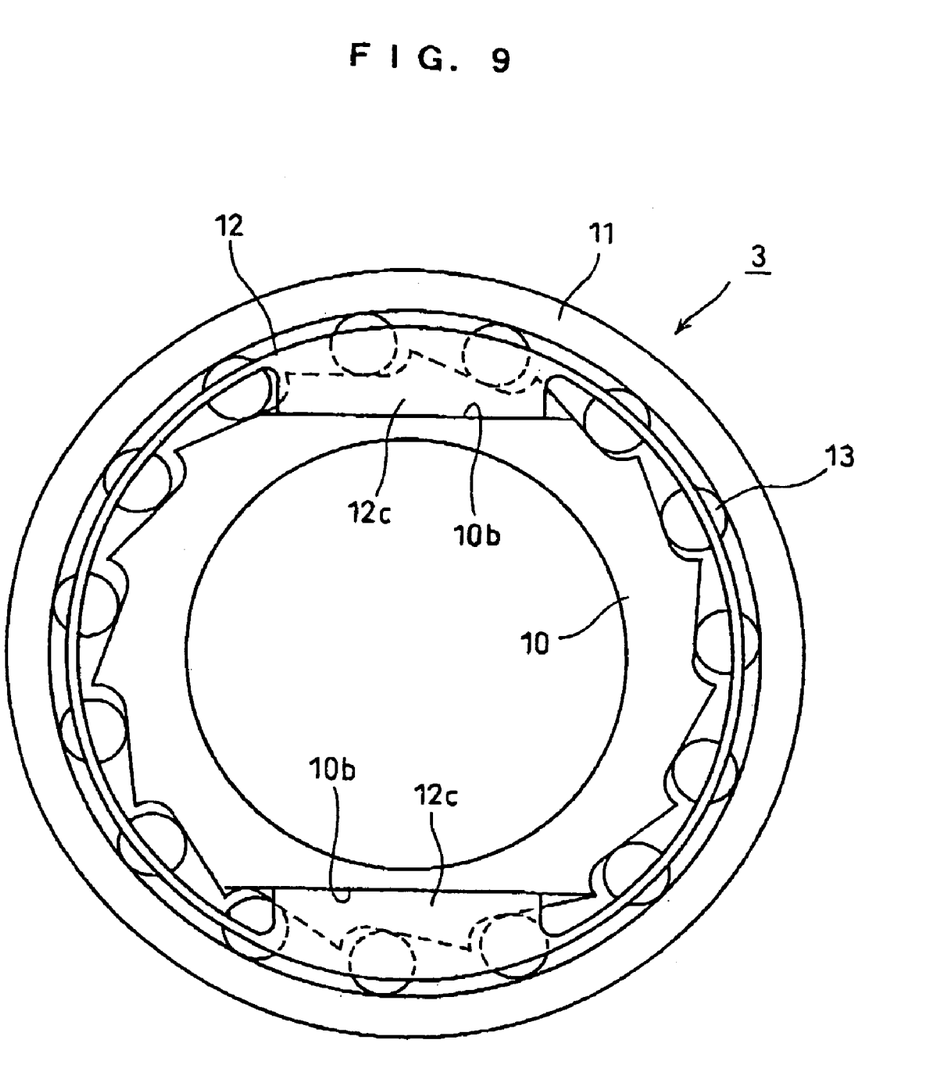
FIG. 9 is a view similar to that of FIG. 7 and illustrates a modified form of the proposed embodiment.

Though one axial end face of the inner ring 10 of the one-way clutch 3 is provided with a slit-like recessed part 10b extended inside and outside in the radial direction in the proposed embodiment described above, as shown in FIG. 9, the recessed part 10b can be formed like a flat key. In FIG. 9, in order to increased the number of rollers 13 used, the circumferential width of the cam face 10a of the inner ring 10 of the one-way clutch 3 is reduced, and the cam face 10a is a form containing a curve. The part containing a curve is a free rotating position of the roller 13.

Though the coil spring 14 is taken as an example for an elastic member of the one-way clutch 3 in the proposed embodiment described above, it can be replaced by various plate springs and elastic pieces.

Further, though the proposed embodiment described above deals with the case where the cam face 10a of the one-way clutch 3 is formed on the inner ring side, it can be formed on the outer ring side. In the case of the above embodiment, the roller can be prevented from unnecessarily being dislocated from the lock position by centrifugal force even in the high speed rotation range, so it is suitable for use in high speed rotation.

However, the embodiment proposed above is such that the rolling bearings 4, 4 on both sides in the axial direction of the one-way clutch 3 are made into the deep groove ball bearings that have relatively small load bearing capacity. In this connection, it is desired to elevate the load bearing capacity of the belt B to suppress warping of the outer ring body 1 and the inner ring body 2, to make the force skewing the roller 13 of the one-way clutch 3 less easy to be generated, and to further improve stabilization of the locking and free operation of the roller 13.

SUMMARY OF THE INVENTION

Thus, it is an object of the present invention to provide a pulley unit having a one-way clutch that easily sets out relative positions between the axial body and the pulley, that can expect stabilized lock and free operations, and that improves productivity.

A pulley unit of the present invention comprising pulleys, axial bodies capable of performing relative rotation with respect to each other and being disposed inside the pulleys to be concentric therewith, a one-way clutch interposed into an annular space formed between the pulleys and the axial bodies, a deep groove ball bearing provided on the base end side of the one-way clutch within the annular space, and a roller bearing provided on the free end side of the one-way clutch within the annular space, wherein an inner rolling surface of a roller of the one-way clutch comprises an outer diameter surface of the axial body while an inner rolling surface of a rolling body of the roller bearing comprises an outer diameter surface of the axial body.

An inner rolling surface of a rolling body of the deep groove ball bearing may be an outer diameter surface of the axial body.

Alternatively, an outer rolling surface of the roller of the one-way clutch may be an inner diameter surface of the pulley, and an outer rolling surface of the rolling body of the roller bearing may be an inner diameter surface of the pulley.

Furthermore, an outer rolling surface of the roller of the deep groove ball bearing may be an inner diameter surface of the pulley.

BRIEF DESCRIPTION OF THE DRAWINGS

These and other objects as well as advantages of the invention will become clear by the following description of preferred embodiments of the invention with reference to the accompanying drawings, wherein.

In all these figures, like components are indicated by the same numerals.

DETAILED DESCRIPTION OF THE INVENTION

The preferred embodiments of the present invention will now be described with reference to the attached drawings.

FIRST PREFERRED EMBODIMENT OF THE PRESENT INVENTION

First, the pulley unit according to the first preferred embodiment of the present invention will be described with reference to FIG. 1. In the first embodiment, the structure is suitable for the configuration where a belt B is wrapped round the free end side of the pulley unit A.

That is, the differences in the first embodiment from the proposed embodiment described above are that a wavy belt wrapping groove is formed mainly in a position biased to one axial end in the outer periphery of the outer ring body 1, and that among two rolling bearings 4, 5 disposed on both sides in the axial direction of the one-way clutch 3, the rolling bearing 5 nearer to the above belt wrapping groove is a needle roller bearing, and the other rolling bearing 4 is a deep groove ball bearing. The needle roller bearing 5 is a general structure comprising a shell outer ring 21, plural needle rollers 22 and a cage 23.

In the first embodiment, the inner ring of the one-way clutch 3 is integrally formed on the inner ring body 2, and the inner ring body 2 is provided with a cam face 10a and a recessed part 10b to which a projecting part 12c of the cage 12 is fitted from the axial direction.

In the outer rind of the one-way clutch 3, on the arrangement side shaft end of the needle roller bearing 5, an oil seal 24 is installed in contact with the outer peripheral surface of the inner ring body 2, and further in the inner ring body 2, on the belt B arrangement side, a seal ring body 25 is installed opposite to the inner peripheral surface of the outer ring body 1 through a very small clearance. By the oil seal 24, the seal ring body 25, and an oil seal 20 of the deep groove ball bearing 4, three of the one-way clutch 3, the deep groove ball bearing 4 and the needle roller bearing 5 are sealed, and both bearings 4, 5 and the one-way clutch 3 are lubricated by a common lubricant.

As described above, in the first embodiment of the pulley unit A, in consideration of the circumstances where load of the belt B is biased to the free end side of the inner ring body 2, concerning the roller bearings on both sides of the one-way clutch 3, the needle roller bearing 5 having a comparatively large load carrying capacity is disposed on the free end side of the inner ring body 2, and a deep groove ball bearing 4 having a comparatively small load carrying capacity is disposed on the base end side. Accordingly, even if the load of the belt B is applied as offset load, as the withstand load capacity of the above needle roller bearing 5 is large, early breakage as before is not caused, and also deflection of the outer ring body 1 and the inner ring body 2 can be restrained so that the force for causing the roller 13 of the one-way clutch 3 to skew is hardly produced to contribute to the stabilization of lock and free operation of the roller 13. Further, since the deep groove ball bearing 4 capable of receiving thrust load is disposed on the base end side of the inner ring body 2, even in the situations where vibration is continuously applied, similarly to the prior art, the axial displacement of the one-way clutch 3 can be prevented. Thus, a contribution to the improvement in life of the pulley unit A can be made, and also the operation of the one-way clutch 3 can be stabilized to heighten the power transmission efficiency between the inner ring body 2 and the outer ring body 1, thereby contributing to an improvement in reliability.

Further, since the one-way clutch 3 and one side needle roller bearing 5 are, so to speak, integrally constructed in the first embodiment described above, handling and assembling work efficiency can be improved so as to contribute to an improvement in productivity.

Further, since the rolling bearing on the base end side of the one-way clutch 3 is made into a deep groove ball bearing 4, an axial gap between the ball 18 and the raceway groove is as small as several μm, and position setting between the axial body 2 and the pulley 1 can be easily carried out, resulting in the position control between the pulley 1 and the auxiliary machine can be accurately performed. In addition, the distance between the pulley 1 and the auxiliary machine can be constricted.

Figure 2:
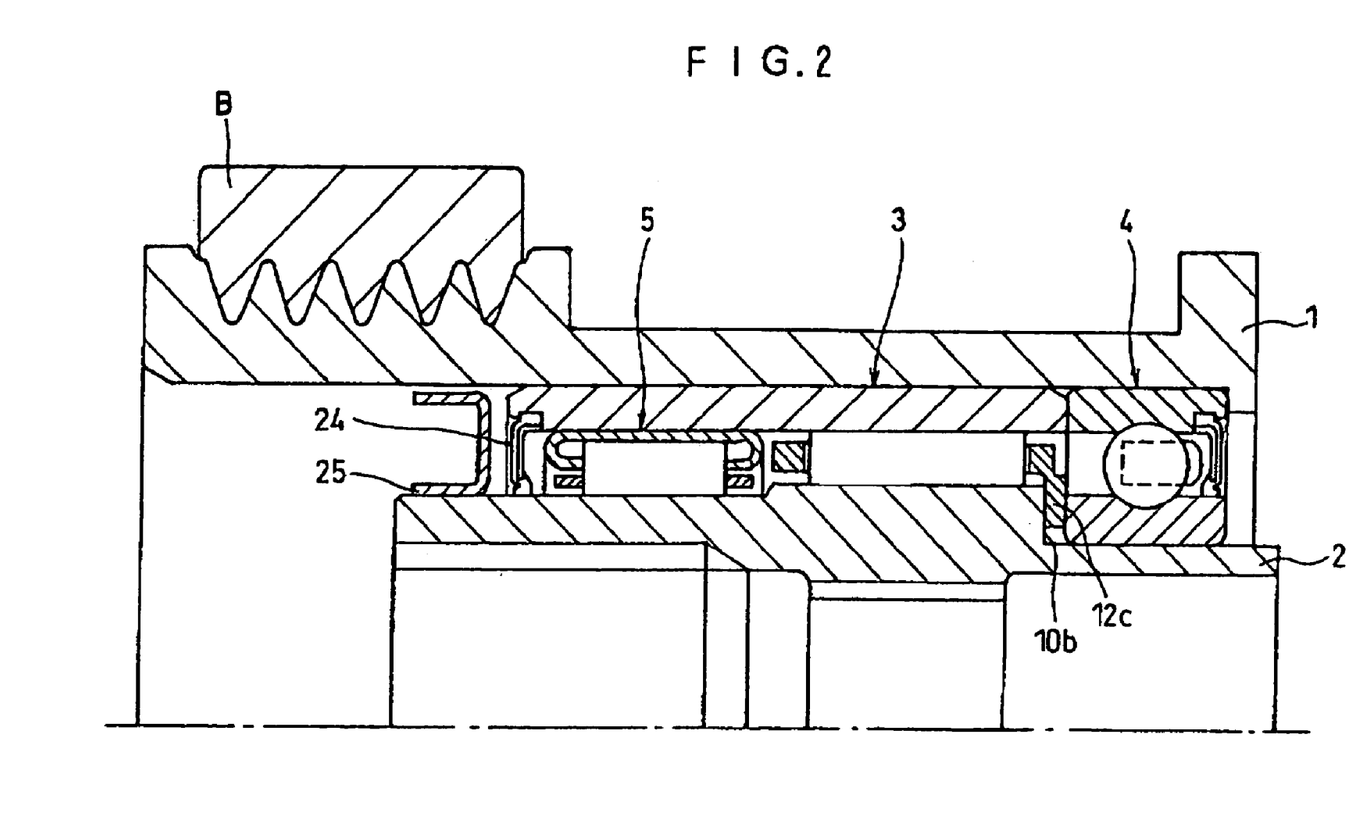
FIG. 2 is a view similar to that of FIG. 1 and illustrates a modified form of the first embodiment according to the present invention.

Though the outer ring body 1 and the inner ring body 2 are of the substantially same length in the first embodiment described above, as shown in FIG. 2, the outer ring body 1 can be made longer than the inner ring body 2. Though the one-way clutch 3 and the roller bearings 4, 5 on both sides thereof are arranged in such a manner as to be biased to the base end side of the inner ring body 2 from the belt B wrapping area in the outer ring body 1 in this embodiment so that excessive load is applied to the needle roller bearing 5 on the belt B side similarly to the above embodiment, the needle roller bearing 5 can be prevented from being broken early because it has a large load carrying capacity.

Though the needle roller bearing 5 is internally installed in the inner periphery of the outer ring 11 of the one-way clutch 3 in the first embodiment, the needle roller bearing 5 may be interposed between the outer ring body 1 and the inner ring body 2.

Further, the detailed constitution of the one-way clutch 3 is not especially limited in the first embodiment. For example, though the coil spring 14 is taken as an example for an elastic member, it can be replaced by various plate springs and elastic pieces. Further, though the embodiment deals with the case where the cam face 10a is formed on the inner ring body 2 side, the present invention can be applied to the case where it is formed on the outside diameter side. In the case of the described embodiment, the roller can be prevented from unnecessarily being dislocated from the lock position by centrifugal force even in a high speed rotation range, so it is suitable for use in high speed rotation.

SECOND PREFERRED EMBODIMENT OF THE PRESENT INVENTION

Figure 3:
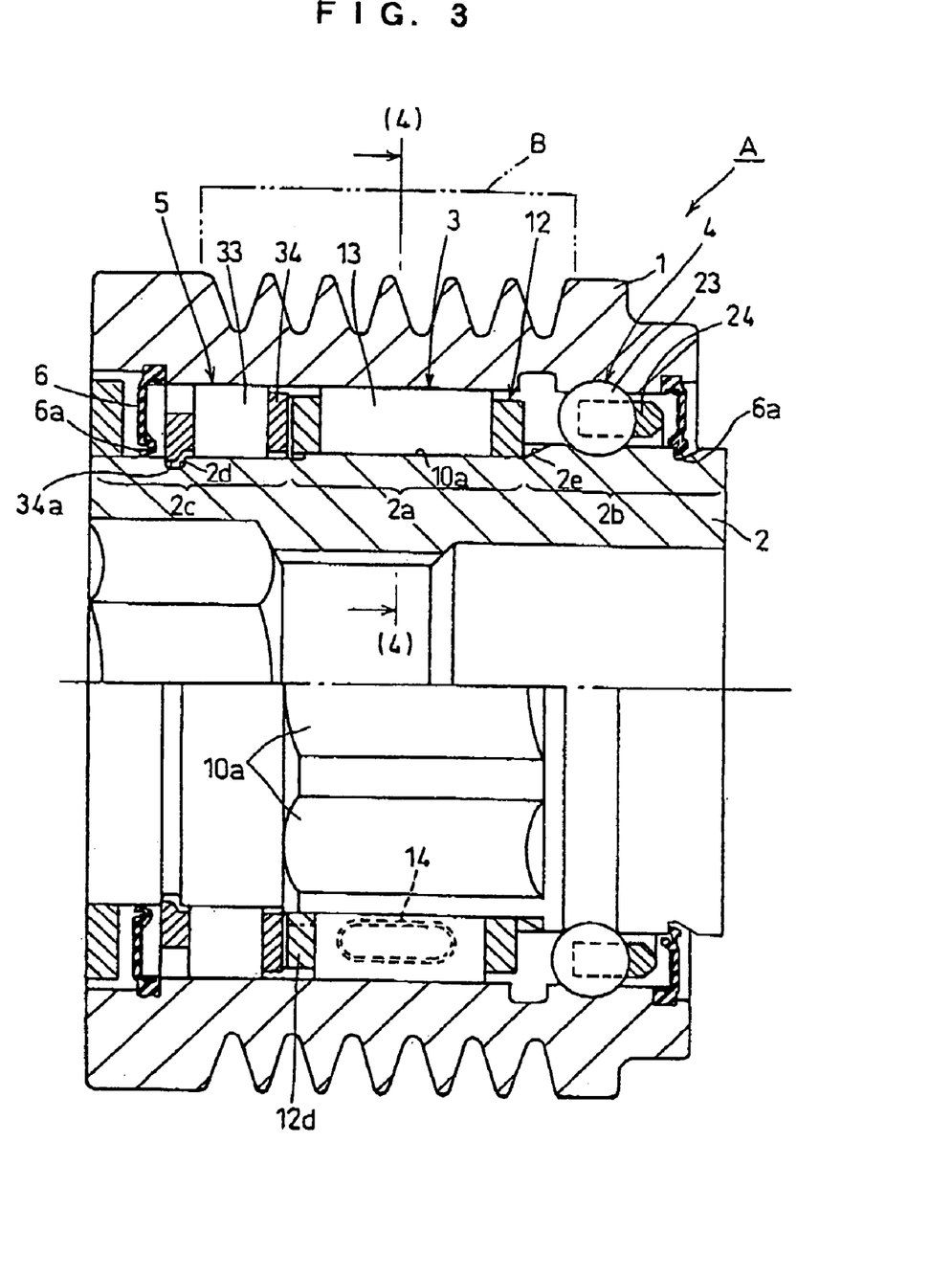
FIG. 3 is a longitudinal section of a pulley unit according to a second embodiment of the present invention.
Figure 4:
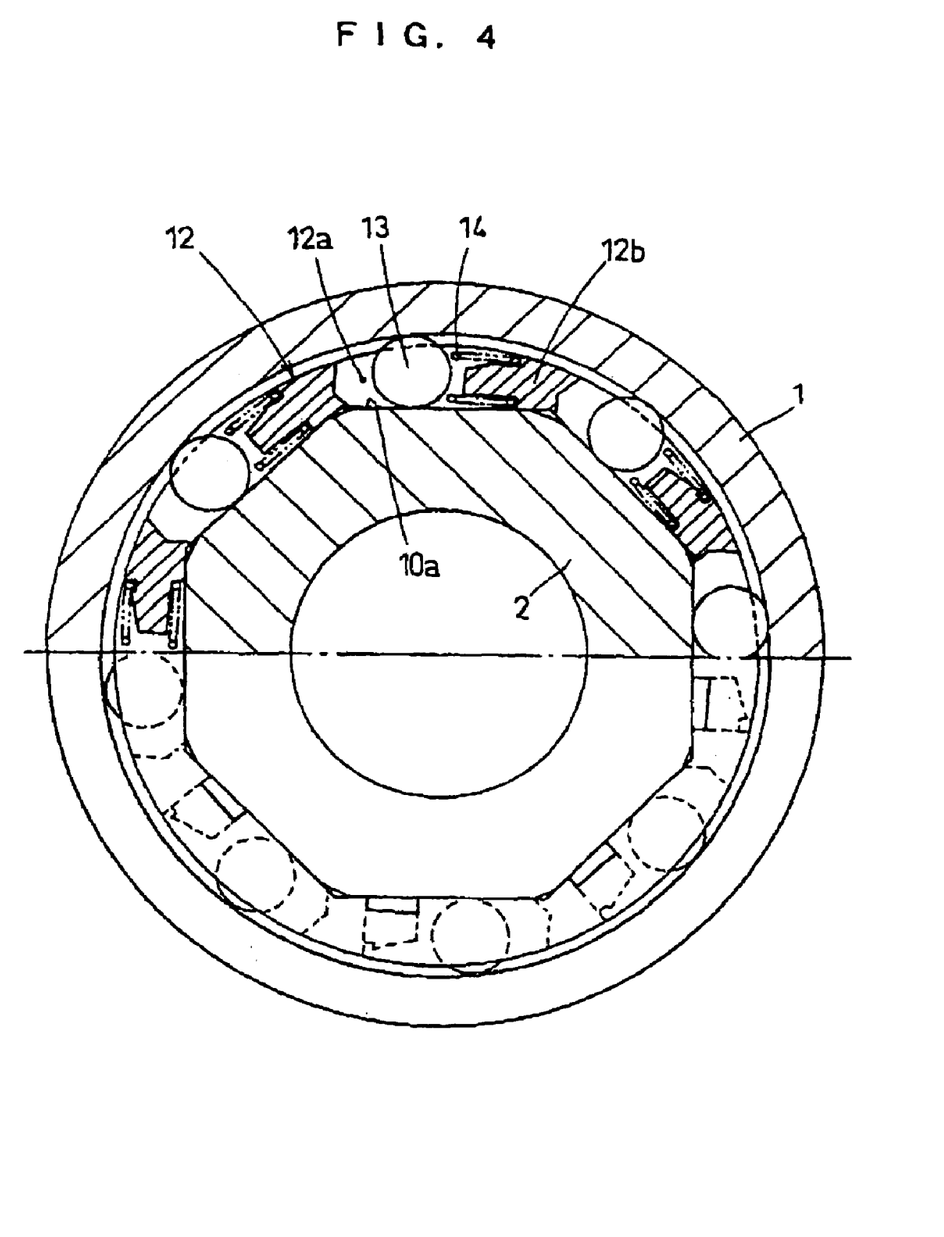
FIG. 4 is a fragmentary view taken in the direction of the arrows along a line (4)—(4) of FIG. 3.

FIG. 3 and FIG. 4 show a second embodiment of the present invention. FIG. 3 is a vertical sectional view of the pulley unit, and FIG. 4 is a perspective view of the section marked with (4)—(4) line in FIG. 3.

The pulley unit A of the illustrated example has a pulley 1, a rotor shaft 2, a one-way clutch 3, a ball bearing 4, a roller bearing 5, and a seal 6.

The pulley unit A of the present embodiment has a constitution wherein, in order to reduce number of the parts and cost for production, the inner and outer rings of one-way clutch 3 and each of the inner and outer rings of the ball bearing 4 and roller bearing 5 are omitted, and the hollow shaft 2 of the pulley unit A also serves as these inner rings, and the pulley 1 of the pulley unit A also serves as the outer ring.

The pulley 1 is driven in rotation through a V-ribbed belt B by, for example, a crankshaft of an automobile engine, and on the outer periphery thereof a corrugated groove to which the V-ribbed belt B is to be applied by winding is formed.

On the inner diameter surface of the pulley 1, in the region on the base end side in the axial direction, a raceway groove through which a ball 23 of ball bearing 4 comprising a deep groove ball bearing is to be set is formed.

A rotor shaft 2 is thrust through inside the pulley 1 as a hollow axial body, being fixed to a input shaft not shown in the drawings (e.g., a rotor of an alternator) of an auxiliary machine of an automobile engine.

On the outer diameter surface of the rotor shaft 2, on several places of the periphery in the intermediate region 2a in the axial direction, the flat cam surfaces 10 of one-way clutch 3 are formed, and in their axial directional two side regions 2b, 2c the inner ring raceways for the ball bearing 4 and roller bearing 5 are secured.

The intermediate region 2a of the rotor shaft 2 is formed in octagonal shape, and both side regions 2b, 2c are formed in circular shape.

In the rotor shaft 2, an outer diameter size of the region 2b which is to form an inner ring raceway of the ball bearing 4 is set to be larger than the outer diameter size of the region 2c which is an inner ring raceway of the roller bearing 5. This is in order to allow to set a one-way clutch 3, ball bearing 4, and roller bearing 5 from one axial direction in order easily between the pulley 1 and the rotor shaft 2. In the region 2b of this rotor shaft 2 a raceway groove in which the balls 23 of the ball bearing 4 comprising the deep groove ball bearing are to be set is formed.

Further, in the region 2c on the other end side in the axial direction set to be in small diameter on the outer diameter surface of the rotor shaft 2, a surrounding groove 2d is provided. By engaging the ring shaped projection 34a disposed inward in the radial direction provided on the inner diameter surface of the holder 34 of the roller bearing 5 to the surrounding groove 2d, the holder 34 is to be positioned in an axial direction.

A one-way clutch 3 is set at the center in an axial direction in the opposed annular space between the pulley 1 and the rotor shaft 2, and its inner ring raceway is constituted by an outer diameter surface of the rotor shaft 2, and its outer ring raceway by an inner diameter surface of the pulley 1.

The one-way clutch 3 is provided with a synthetic resin made annular holder 12, a plurality of rollers 13 as rolling member, and an elliptical coil spring 14 as an elastic member.

In this case, the holder 12 of the one-way clutch 3 is disposed in an annual space opposed to the pulley 1 and the rotor shaft 2 and externally installed under the condition of being positioned in a circumferential direction and the axial direction, and on an outer diameter surface of the rotor shaft 2, in the regions corresponding to the cam surfaces 10a in several places in the circumferential direction the pockets 12a which penetrate through inward and outward in the axial direction are provided. Between the circumferential direction of the respective pockets 12, there are the axial directional posts 12b.

The roller 13 of the one-way clutch 3 is stored in each pocket 12a of the holder 12 one by one under the condition where the rolling range in the circumferential direction is restricted.

The coil spring 14 of the one-way clutch 3 is installed to the projection 12c which is provided in projection on the inner wall surface of each post member 12b of the holder 12, and is designed to press the roller 13 to a narrow side (lock side) of the wedge shaped space formed by the cam surface 10a and the inner diameter surface of the pulley 1.

The inner diameter surface of the holder 12 of the one-way clutch 3 is formed in a configuration to receive in agreement with the octagonal outer diametrical surface shape of the rotor shaft 2 in an intermediate region 2a in the rotor shaft 2, thereby preventing the holder 12 from being turned in a circumferential direction to the rotor shaft 2.

The holder 12 of the one-way clutch 3 is prevented from moving to the side of the ball bearing 4 by the tapered step differential part 2e which connects the cam surface 10a in the intermediate region 2a with the large diameter region 2b, and prevented from moving to the roller bearing 5 side by the holder 34 of the roller bearing 5 which is position-set in the axial direction to the rotor shaft 2.

The ball bearing 4 and the roller bearing 5 are provided one on each of the both sides in the axial direction of the one-way clutch 3 in the opposed annular space between the pulley 1 and the rotor shaft 2 as the roller bearings.

The ball bearing 4 is so formed that its inner ring raceway is constituted by an outer diameter surface in one region 2b in an axial direction of the rotor shaft 2 and its outer ring raceway by an inner diameter surface of the pulley 1, to be an ordinary deep groove ball bearing comprising a plurality of balls 23 as rolling members and a crown shaped holder 24 for supporting them.

The holder 24 is made of resin.

The roller bearing 5 is so formed that its inner ring raceway is constituted by an outer diameter surface in other region 2c in the axial direction of the rotor shaft 2 and its outer ring raceway by an inner diameter surface of the pulley 1, to be a cage and roller comprising a plurality of rolls 33 as rolling members and a holder 34 for supporting them.

The holder 34 is made of resin as well.

In the above annular space, seal 6 is set to the outer end side in the axial direction of the ball bearing 4 and the roller bearing 5. The seal 6 has a contact style made by fixing an end side of an elastic member covering the outer periphery of the annular core metal to an inner diameter surface of the pulley 1, and the other end side thereof being set in direct contact with the outer diameter surface of the rotor shaft 2 as a seal lip 6a. Although there are various styles available for the seal lip 6a, the present invention is not specifically limited to the style.

Referring to the operation of the pulley unit A above, in short, according to the rotation speed difference between the pulley 1 and the rotor shaft 2, a one-way clutch 3 becomes either locked state or free state to make it possible to transmit motive force to the rotor shaft 2 from the pulley 1 or to shut transmission of motive force. On the other hand, when one-way clutch 3 has become free condition, the rotor shaft 2 continues to rotate by the rotary inertia of itself.

In the pulley unit constituted as above, position setting between the axial body 2 and the pulley 1 can be made with ease, and stabilization of locking and freeing motions can be expected, and productivity can be improved.

Figure 1:
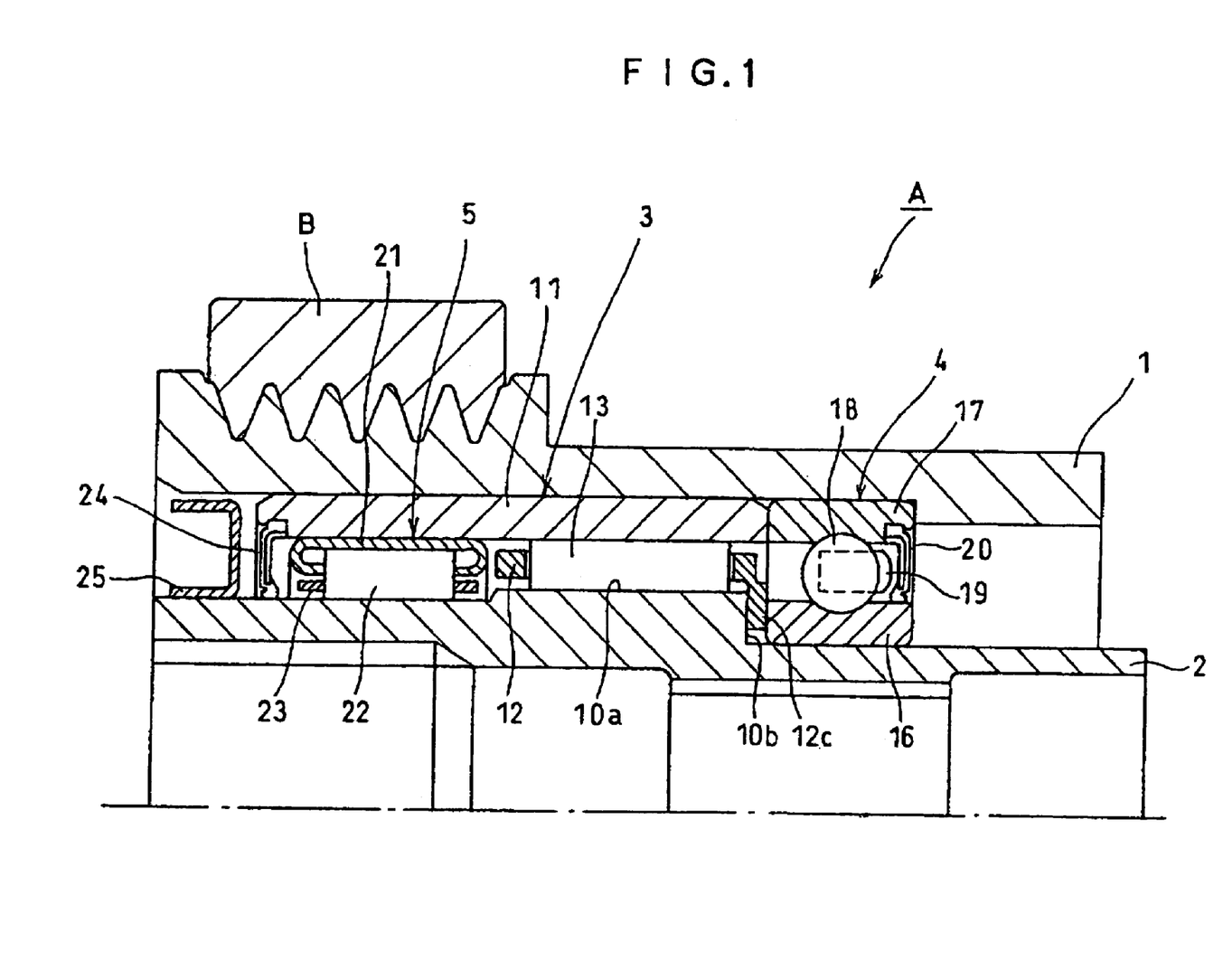
FIG. 1 is a longitudinal section of a pulley unit according to a first embodiment of the present invention.

Furthermore, as another modified embodiment, the following constitution within the embodiment shown in FIG. 1 may be adopted.

An inner rolling surface of a roller 13 of a one-way clutch 3 shall comprise an outer diameter surface of an axial body 2; an inner rolling surface of a rolling body 22 of a roller bearing 5 shall comprise an outer diameter surface of the axial body 2; and inner rolling surface of a rolling body 18 of a deep groove ball bearing 4 shall comprise an outer diameter surface of the axial body 2.

An inner rolling surface of the roller 13 of the one-way clutch 3 shall comprise an outer diameter surface of the axial body 2; an inner rolling surface of the rolling body 22 of the roller bearing 5 shall comprise an outer diameter surface of the axial body 2; an outer rolling surface of the roller 13 of the one-way clutch 3 shall comprise an inner diameter surface of the pulley 1; and an outer rolling surface of the rolling body 22 of the roller bearing 5 shall comprise an inner diameter surface of the pulley 1.

An inner rolling surface of the roller 13 of the one-way clutch 3 shall comprise an outer diameter surface of the axial body 2; an inner rolling surface of the rolling body 22 of the roller bearing 5 shall comprise an outer diameter surface of the axial body 2; an inner rolling surface of the rolling body 18 of the deep groove ball bearing 4 shall comprise an outer diameter surface of the axial body 2; an outer rolling surface of the roller 13 of the one-way clutch 3 shall comprise an inner diameter surface of the pulley 1; and an outer rolling surface of the rolling body 22 of the roller bearing 5 shall comprise an inner diameter surface of the pulley 1.

An inner rolling surface of the roller 13 of the one-way clutch 3 shall comprise an outer diameter surface of the axial body 2; an inner rolling surface of the rolling body 22 of the roller bearing 5 shall comprise an outer diameter surface of the axial body 2; an outer rolling surface of the roller 13 of the one-way clutch 3 shall comprise an inner diameter surface of the pulley 1; an outer rolling surface of the rolling body 22 of the roller bearing 5 shall comprise an inner diameter surface of the pulley 1; and an outer rolling surface of the rolling body 18 of the deep groove ball bearing 4 shall comprise an inner diameter surface of the pulley 1.

While there has been described what is at present considered to be preferred embodiments of the present invention, it will be understood that various modifications may be made therein, and it is intended to cover in the appended claims all such modifications as fall within the true spirit and scope of this invention.

What is claimed is:

1. A pulley unit mounted around a shaft having a free end and a base end, the shaft extending, at the base end, in an axial direction from an alternator, the pulley unit when mounted on the shaft has a free end side near the free end of the shaft and a base end side near the base end of the shaft, the pulley unit comprising:

inner and outer concentric ring bodies that define an annular space there between;

a roller bearing located in the annular space at the free end side adjacent the free end of the shaft;

a ball bearing located in the annular space at the base end side adjacent the base end of the shaft, the roller bearing having a comparatively large load carrying capacity as compared to the ball bearing, the ball bearing having a comparatively small load carrying capacity;

a one-way clutch located in the annular space between the inner and outer ring bodies and between the roller bearing and the ball bearing, the one-way clutch including a cam face defined on the outer surface of the inner ring body;

a holder defining a pocket, the holder being positioned on the cam face; and a roller with a movable surface and an elastic member positioned in the pocket so that the movable surface is in rolling contact with the inner surface of the outer concentric ring body and the outer surface of the inner concentric ring body, the roller locking the one-way clutch when the outer concentric ring body is rotated faster than the inner concentric ring body and the roller unlocking the one-way clutch and engaging the elastic member when the outer concentric ring body is rotated slower that the inner concentric ring body;

the roller bearing being having a cylinder in rolling contact with the outer surface of the inner ring body, axial movement of the holder of the one-way clutch being restricted by the inner ring body adjacent to the ball bearing, and a belt engaging the outer ring body at the free end side in a region including only the roller bearing and the one-way clutch.

2. The pulley unit of claim 1, wherein a point of application of a load of a belt is set as to be biased to the free-end side of the pulley unit.

3. A pulley unit mounted around a shaft having a free end and a base end, the shaft extending, at the base end, in an axial direction from an alternator, the pulley unit when mounted on the shaft has a free end side near the free end of the shaft and a base end side near the base end of the shaft, the pulley unit comprising:

inner and outer concentric ring bodies that define an annular space there between;

a roller bearing located in the annular space at the free end side adjacent the free end of the shaft;

a ball bearing located in the annular space at the base end side adjacent the base end of the shaft;

a one-way clutch located in the annular space between the inner and outer ring bodies and between the roller bearing and the ball bearing, the one-way clutch including a cam face defined on the outer surface of the inner ring body;

a holder defining a pocket, the holder being positioned on the cam face; and a roller with a movable surface and an elastic member positioned in the pocket so that the movable surface is in rolling contact with the inner surface of the outer concentric ring body and the outer surface of the inner concentric ring body, the roller locking the one-way clutch when the outer concentric ring body is rotated faster than the inner concentric ring body and the roller unlocking the one-way clutch and engaging the elastic member when the outer concentric ring body is rotated slower that the inner concentric ring body; and the roller bearing including a rolling body in the form of a cylinder in rolling contact with the outer surface of the inner ring body, and axial movement of the holder of the one-way clutch being restricted by the inner ring body adjacent to the ball bearing, a belt engaging the outer ring body at the free end side in a region including only a race-way for the roller bearing and a race-way for the one-way clutch.

4. The pulley unit of claim 3, wherein a point of application of a load of a belt is set as to be biased to the free-end side of the pulley unit.

\* \* \* \* \*